(12) United States Patent
Maycock

(10) Patent No.: US 10,031,977 B1
(45) Date of Patent: Jul. 24, 2018

(54) DATA CONTENT FILTER

(71) Applicant: Rena Maycock, Dublin (IE)

(72) Inventor: Rena Maycock, Dublin (IE)

( * ) Notice: Subject to any disclaimer, the term of this patent is extended or adjusted under 35 U.S.C. 154(b) by 0 days.

(21) Appl. No.: 15/499,856

(22) Filed: Apr. 27, 2017

Related U.S. Application Data

(60) Provisional application No. 62/451,050, filed on Jan. 26, 2017.

(51) Int. Cl.
*G06F 7/00* (2006.01)
*G06F 17/30* (2006.01)
*G06F 3/0484* (2013.01)

(52) U.S. Cl.
CPC ...... *G06F 17/30867* (2013.01); *G06F 3/0484* (2013.01); *G06F 17/3053* (2013.01); *G06F 17/3056* (2013.01); *G06F 17/30554* (2013.01)

(58) Field of Classification Search
CPC ......... G06F 17/30256; G06F 17/30268; G06F 17/3028; G06F 17/30115
USPC ................................................ 707/737, 722
See application file for complete search history.

(56) References Cited

U.S. PATENT DOCUMENTS

| | | | |
|---|---|---|---|
| 8,762,312 B1 | 6/2014 | Newstadt et al. | |
| 9,076,008 B1* | 7/2015 | Moy | G06F 21/60 |
| 2005/0021397 A1 | 1/2005 | Cui et al. | |
| 2009/0172589 A1* | 7/2009 | Brown | G06F 3/04845 |
| | | | 715/787 |
| 2009/0227232 A1* | 9/2009 | Matas | H04M 1/665 |
| | | | 455/411 |
| 2011/0258656 A1* | 10/2011 | Michel | H04N 21/4307 |
| | | | 725/27 |
| 2012/0090023 A1* | 4/2012 | Chow | G06F 21/00 |
| | | | 726/19 |
| 2012/0095837 A1 | 4/2012 | Bharat et al. | |
| 2012/0278194 A1* | 11/2012 | Dewan | G06F 11/0742 |
| | | | 705/26.1 |
| 2013/0073989 A1* | 3/2013 | Harris | G06Q 10/10 |
| | | | 715/758 |
| 2014/0038546 A1* | 2/2014 | Neal | G06Q 10/103 |
| | | | 455/405 |
| 2014/0195525 A1* | 7/2014 | English | G06F 17/30864 |
| | | | 707/722 |

(Continued)

OTHER PUBLICATIONS

"Setting Restrictions for Content and Apps", Nov 28, 2014.*

(Continued)

*Primary Examiner* — Binh Van Ho
(74) *Attorney, Agent, or Firm* — Martin IP Pty Ltd

(57) ABSTRACT

A method, system and product for filtering out data content on a computing device that is integrated into the operating system of the computing device, comprising receiving, by the computing device and in response to a network request by an application, an object associated with content identifiers. The method, system and product further comprise determining, by the computing device and based on an indication of selected filter criteria, a respective weighted probability for the object, and determining, by the computing device, a graphical element for the application based on the weighted probabilities. The method, system and product further comprise outputting, by the computing device and at the graphical user interface of the computing device, the graphical element.

18 Claims, 7 Drawing Sheets

(56) References Cited

U.S. PATENT DOCUMENTS

2016/0006604 A1* 1/2016 Freimark ............ H04L 41/5041
455/419

OTHER PUBLICATIONS

Simon Sage, "How to install Android Apps", May 2, 2011 (Year: 2011).*
"Setting Restrictions for Content and Apps", Nov. 28, 2014.*

* cited by examiner

DATA CONTENT FILTER

RELATED APPLICATIONS

This application claims the benefit of provisional application No. 62/451,050 filed on Jan. 26, 2017, the entire disclosure of which is hereby incorporated by reference herein.

BACKGROUND OF THE INVENTION

A user of a computing device may use any one of a large number of different applications and be exposed to a large amount of data content. While executing any of the applications, the user may receive information from websites, photos, advertisements, or other types of information. Some of this information is unwelcomed by the user of the computing device or a parent of a child using the device. Some applications on the computing device may enable a user or administrator to restrict access to the application or restrict certain content being shown to the device user for that application. Some applications may filter out websites for certain users, however, this undesirable information may be accessible to the user via other applications or file types. Controlling content on a computing device requires the arduous task of going into each application that offers content control to restrict some types of content, or other apps that are specifically for controlling content only restrict certain types, such as certain websites, leaving much unwelcomed content accessible to the user. Some internet providers filter content based on network access requests for network accounts. Many applications don't let you restrict the content that is shown to the user when using that application.

It will be appreciated that reference herein to "preferred" or "preferably" is intended as exemplary only.

SUMMARY OF THE INVENTION

In one aspect, a system, method, and computer program product is described for filtering content information available to the user of a computing device.

For example, the method for filtering out data content on a computing device may integrate with the operating system of the computing device. The method may include receiving, by a computing device, an indication of a selection of filter content and receiving, by the computing device, an object associated with content identifiers. The method may further include determining, by the computing device and based on the content identifiers, a respective weighted probability for the received object, determining, by the computing device, a graphical element based on the weighted probabilities and the selection, and output the graphical element.

In yet another example, the system for filtering content by an operating system of a computing device includes a first database including a plurality of filter content identifiers, a second database including a user selected group of filter content identifiers, and a processor configured to receive objects associated with content identifiers from a remote server in the local computing device. The system may further include a non-transitory computer readable medium encoded in the operating system of the computing device coupled to the processor to compare the received content identifiers associated with the object with the data stored in the first database, compare the received content identifiers associated with the user selected group of filter identifiers, and generate a graphical element based on the comparisons of the objects associated with the user selected group of filter content identifiers.

In another example, the content filtering system for filtering content received from an internet computer network by a local computing device, said filtering system may include an operating system of the local computing device at least one filtering scheme. A plurality of sets of logical filtering elements; and a remote ISP server coupled to said local computing device and said Internet computer network, said operating system of the local computer associating each one of said filtering elements to at least one filtering scheme, said local computing device receiving objects associated with logical filtering elements from a remote server of the internet computer network, and executing said associated filtering scheme utilizing said associated set of logical filtering elements when the operating system of the local computing device receives the object.

In alternative preferred embodiments, the computer program product embodied in a non-transitory computer readable storage medium further comprises programming instructions causing the coupled computer to filter a plurality of content from the remote server.

The articles "a" and "an" are used herein to refer to one or to more than one (i.e., to at least one) of the grammatical object of the article. By way of example, "an element" means one element or more than one element. As used herein, the use of the singular includes the plural (and vice versa) unless specifically stated otherwise. Throughout this specification, unless the context requires otherwise, the words "comprise," "comprises" and "comprising" will be understood to imply the inclusion of a stated step or element or group of steps or elements but not the exclusion of any other step or element or group of steps or elements. Thus, use of the term "comprising" and the like indicates that the listed elements are required or mandatory, but that other elements are optional and may or may not be present.

The details of one or more examples are set forth in the accompanying drawings and the description below. Other features and/or advantages will be apparent from the description and drawings, and from the claims.

DETAILED DESCRIPTION

Figure 1:
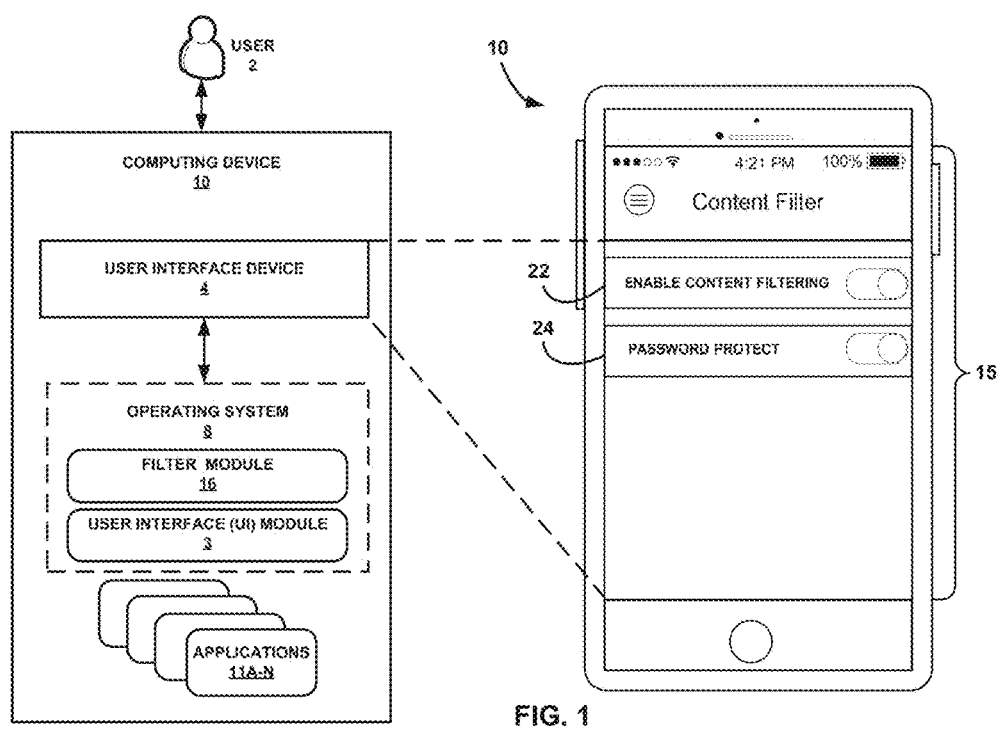
FIG. 1 is a conceptual diagram illustrating an example of a computing device configured to execute one or more of filtering content techniques, in accordance with one or more aspects of the present disclosure.

In general, this disclosure is directed to techniques that may enable a computing device to filter all content displayed on the graphical user interface of the computing device thereby allowing the user of the computing device to control what content is viewed on the device. Content may include photos, pictures, videos, text, sound, graphics, virtual content, or any other data communicated to the user via the computing device. Users are exposed to too much content while accessing applications on their smart computing devices. Because there is so much content that is available to the user, the user has a tedious task of filtering specific content for each of the applications. The large amount of content, the many ways to describe the content, and the large number of applications that receive content may make it difficult and time consuming for a user to filter specific content for every application on their computing device. Additionally, even if the user applies filters where possible, the unwanted content may still get through the network via seemingly safe gateways such as Facebook, Twitter, various chatrooms, the internet, or other content sources. The filter of this disclosure is an application that prevents the end-user from being exposed to media that they desire not to be exposed to and desire not to be downloaded to the device. This disclosure may encompass the parental uses for the application as well as a work or educational environment where an individual sets the filter controls for other users of the device so that the device and those end users are not exposed to specified content.

The filter may limit specified content by monitoring incoming network content requests, such as text, image, video, sound, virtual reality, sound, graphic, and other content forms. In some examples, the filter may detect specific keywords or patterns, to flag the content, and suppress the display of the content. In other examples, the filter may detect data types or metadata to be filtered. The filter may run on mobile devices, as a running application, integrated into the mobile platforms core functionality, or else the filter may have access to the core network functionality. In some examples, the application may have the authority and access to the operating system for intercepting application specific communications. Thus, the filter may intercept more than an application specific communication, and may intercept communication with any application on the computing device. Therefore, the filter of this disclosure may be either part of the core network functionality, or the filter may have access to it. The applications may grant permission or agree to filtering in order to run the filter application. Without permission, the application may not run or may not install on the computing device.

The user may configure the content filter. For example, the user may select to turn the filter "ON" or "OFF" for engaging the filter or ceasing running the filter. The filter settings may be accessible by a controlled access, such as password protection or biometrics, such as touch identification. When turned on, the filter application may display a selection of pre-determined topics, or filter criteria. The list of topics may be a single keyword or a list of standard phrases. In some examples, the user may configure a personalized list of text keywords, phrases, etc. The selection and any personalization data added by user input may be part of determining the content to filter. The filter may then apply each filter to a combination of text, images, audio, video, etc., and may include current and future media formats, for example virtual reality. Computing devices often have multiple applications that the user may run individually or simultaneously. In some examples, the user may select the applications, from a list of applications, to apply the filter. The user may personalize the filter by selecting applications for applying the filter, individually selecting each application. A user may wish to not apply the filter in a specific application in some instances. For example, a parent may not select a banking application to apply the filter, because the banking application always requires a login and rarely receives content that needs to be filtered. In some examples, the user may select "all" indicating that the filter applies to all applications on the computing device. Applications installed after the user configures the filter would be included in the list of applications for applying the filter, and in examples where the "all" is selected, the filter may apply to the new applications automatically. Selected applications may have settings that require changing to allow the filter to function properly. In these instances, the application may grant access to the filter application so that data can be intercepted and filtered.

Keywords may be one example of data that the computing device uses to determine filter content. The keyword list can be arbitrary, and can also include predetermined lists already part of the filter, from templates, to filter out generalized topics, such as violence, or war, for example. In accordance with techniques of the present disclosure, the computing device may automatically filter content that the user selects from any or all the applications on the computing device. The computing device may then filter the selected content, so that the content is not part of the graphical user interface display. In one example, the user may select a group of words associated with a topic that the user would like to filter. Groups of words are associated with topics, subjects or themes. For example, a parent may wish that their young child does not see topics that require parental guidance or "adult" content while using an iPad, and the computing device may present the user at one of the setting or control screens with a list that may include, as one example, "War, Violence, Sex, Drugs" or may include other words. The user may select from this list of subjects that includes this plurality of subjects and may select one or more of the terms. In other examples, the filter may have a selection of groups, which may contain multiple words associated with a topic or a theme for each respective group. Word groups may allow the user to understand what a particular group may filter and the scope of filtering a particular topic. For example, one group may include the words, "War, guns, violence, shooting, combat, bloodshed, fighting, combat, airstrike, wounded, bombing" and possibly other words that are associated with "war and conflict." In some examples, the user may enter words, at the presence sensitive display of the computing device or by voice dictation of the computing device, associated with topics that they wish to filter, such as in the previously presented example, a user may select the group and type in "terrorism" to expand on the topic of "war and conflict." In the examples where the user may determine at least some of the keywords to be used in the content filtering, a user interface may be present that allows the user to enter such words, for example a keyboard displayed at the graphical user interface of the computing device or the computing device may have dictation capabilities with supporting hardware, such as a microphone and sound speakers. In some examples, words entered by the user may be saved either on the local computing device (e.g., in the filter application) or in a remote server and groups of categories may be updated as a machine learning technique for the user's preferences and an update filter.

The computing device may expand the user's input with words associated with the user's entered words. In other aspects of the disclosure, the filter may automatically determine other associations with the group of words, a topic associated with the group, or with each of the words of the group selected by the user and may also filter those associations. The word association technique expands the filter to determine words that are not already in the selected group, but are relevant to the subject and would allow unwanted content to be displayed. Expanding word groups with word associations and word determinations may broaden the scope of content filtering and help prevent filtered content from being displayed. In some examples, the computing device may use dynamic filtering by changing an input word provided by the user and automatically determine a different word for a specific category without user input. For example, the filter may have stored words associated with specific categories that may be used as alternates and additional key words. In other examples, the computing device may use parsing techniques to determine other key words for dynamic categorized content filtering. Other techniques may also be used, such as searching networks, applications, data spreadsheets, and other data sources for keywords that are used in addition to or as an alternate to a specific key word entered buy the user. In yet other examples, the dynamic categorized content filtering may be done on a remote server and the filter may receive the alternate and additional keywords to include in the filter of the computing device. For example, a cloud service provider could provide in real time or as a software update the dynamic data to the computing device. The remote server may use techniques to find and determine other words that are more suited as key words for a category, and may send to the user's computing device instruction to modify the filter keywords of the computing device without the user knowing or being notified, and thus, automating the filter modifications.

Once the user completes configuration of the filter, the device may then run silently in the background without interrupting any applications executing on the computing device, and continuously runs on the computing device, and in some examples, the filter may continuously run integrated with the operating system. The content filter application may intercept all network communications. In one example, the filter may identify application specific request responses where possible, where the output of graphical content is requested, and the computing device may determine a compatible content and replace the flagged content with the compatible content for that application, with information that contains a standard message rather than the flagged content. Request responses may also include saving data on the computing device or changing functionality of an application executed on the computing device or a setting of the computing device. The filter identifies all types of request responses and may require that permission be granted to the filter application for accessing data and accounts associated with a specific application.

Alternatively, in other examples, the response is suppressed, so the user does not see the content, or else sees empty content in the graphical area where the filtered content would have been displayed. For example, a graphic picture of violence is filtered and the area where the unfiltered picture would appear is now blank or shaded. In some examples, it may be the entire picture or photo that is filtered, and in other examples, the computing device may identify the object in the photo using object recognition techniques that the computing device determines to be filtered content, and the computing device, in this example, may filter just the object or part of the object, and does not disturb the rest of the picture or photo. Using partial object filtering, the computing device allows the user to see part of the image undisturbed while still filtering the unwanted content.

In other aspects of the discloser, the user may select different modes of filtering that determine the level of filtered content that the user may want to see. For example, a first mode may be a standard mode where the user may view the content that was filtered. For example, the filtered content is replaced with a graphical display that allows the user to tap a graphical button to show the filtered content at the display of the graphical user interface either expanding the current display to include the content, or showing the content in a new window or graphic. The user may further input or indicate whether the content remains part of the filtered content or if the content should not be filtered and become part of the graphical user interface display that does not contain filtered content. The user's input associated with the filtered content may update the group of filtered content, allowing the computing device to learn what content or associations with the content that the computing device should filter, or should not associate with filter content. The second mode may be a parental control or in company work setting where filtered content cannot be viewed by the user (i.e., the child or employee). The parent may access their account (e.g., filter application account or administrator account to access the device settings), for example, to view filtered content or change preferences of filter content. The second mode assists in limiting the exposure of the user, such as a child, to the filtered content.

There may be interaction with an external entity, or hosted server etc. The functionality may be in the running application local computing device. If the content filter is not already installed on the computing device, then the user may download and install the application, and may obtain upgrades to an already installed application, and receive updated configurations, etc. In some examples, the running functionality may be primarily on the local computing device, so that the computing device maintains processing speed. In other examples, the filter may be located on an external server to run, and the function of the application is done remotely, or the filter may access a remote server to obtain data, such as filter group choices, word associations and alternates to user input words, user input, updates, etc. The remote server may function as a backup to the filter running locally on the computing device, assisting in functioning or taking over functionality.

The filter runs as a background process on a computing device, for example, but not limited to, a mobile smartphone, tablet, television, watch, smart glasses, or personal laptop or desktop. The application can be installed as a separate application, downloadable from the devices platform specific App Store, or website, or else be embedded in the operating system. By making the application part of the operating system, or part of the core functionality, may allow the application to continuously run. For both, the filter application may receive updates and maintenance in a separate downloadable file.

Because the filter application may run in the background or as part of the operating system, the filter may intercept incoming network traffic over standard protocols, such as in one example HTTP and HTTPS, issued by a computing device. The computing device sends the data of each intercepted response to a matching platform, within the computing device or located on an external server, where the matching platform parses and matches patterns the received network data against the configured criteria of the filter. The matching platform is a computing resource, such as a program integrated into the filter application or separate to the filter, serving as an external resource accessible by the filter application on the internet. In addition to the HTTP example above, the match techniques may apply to text, images, audio, video, and any other media formats, included yet to be created media formats. The filter uses the configured settings as an initial basis for starting the text based matching.

Text base matching may incorporate standard text parsing rules. Image, video, and audio matching will mandate more sophisticated techniques, such as machine learning algorithms, object recognition, or human interaction in the matching process. Matching technologies may in some examples include, and not exclusive to: basic text parsing, machine learning, and human interaction. Matching techniques may also involve matching performed by an external networked resource, as well as locally-run matching. In addition to matching the content, the filter application may also receive meta data, source data, location data, or other auxiliary data associated with the object and received with the content or object. The filter may use the techniques described herein to determine filtering the content of the object based on the auxiliary, e.g. meta data, file size, etc.

In some examples, applicable discrete blocks may be reconstituted to have similar expected format, but without the content that contained the matched keywords. The reconstituted data comprises the categorized content that contained the text, video, etc., as is context dependent. In general, the filter may restrict whole article, advertisement, or post and not only the specific keywords within. Whatever represents a discrete and wholly contained categorized unit as determined by the specific media platform. There can be the option to view the actual filtered content in its originality, if the user desires. This can be achieved by a user selectable button that prompts the user to view the original content. This allows multiple usage scenarios beyond self-imposed content restrictions, for example to restrict content viewable in organizations in the workplace, or for parents to restrict content accessible by children. In these cases, the option to view original content can be suppressed. Installed applications must agree to allow their content intercepted by the filter application. Non-compliance or non-agreement prevents the applications from being installed or run.

The filter application also takes current security considerations into account. Current mobile internet technology may present challenges to develop a standalone app that can intercept all network traffic outside of the applications own network requests and responses. The operating systems of the main mobile providers (e.g., Apple, Google Android, and Windows Mobile) apply security restrictions on the default running environment to prevent running such stand-alone interceptor applications, for security reasons. If it were possible, this would allow a security hole for "Man in the Middle" security attacks, where an app could be installed on the device that intercepts network traffic that could be used by entities other than the user (hackers, criminals, etc.) in ways the users did not intend nor desire, including stealing information, and modifying the device in undesirable ways. There are ways around this, which involve circumventing the default running environment, such as "Jailbreaking" or "Rooting" the device, that changes the running environment to one with less restrictions. However, this is neither straightforward for most users, is a complicated process, is neither recommended not supported by the manufacturer, and typically voids the warranty on the device.

The computing device platform may be tightly integrated into the device operating system for the functionality to become installed. The restrictions outlined above must include exceptions for the filter applications and may involve cooperation form the device or mobile platform vendors to support this. In some instances, applications may grant permission to the filter application, so that the filter application may receive the content for filtering and the intended recipient application may receive the filtered content for display.

Described herein is a system, method, and computer program for filtering content to be filtered at the graphical user interface of a computing device. The filter may be pre-loaded to each new device and may apply to all programs displaying content at the graphical user interface. In some examples, the filter may be a part of the operating system of the computing device. Having the filter integrated as a part of the operating system successfully filters content from even the most challenging content sources that circumvent ad-blocking software, etc. A built-in protector improves how users experience mobile devices and diverts the consumer away from unwanted content rather than being exposed to it. In other examples, the filter may be later installed on the computing device.

Throughout this disclosure, several exemplary embodiments are described based on either a method or a system. However, one skilled in the art would be able to implement the invention in at least one of method, system, and computer program product.

Techniques of this disclosure may provide one or more advantages. For example, by automatically identifying and filtering specific content for all applications and content displayed at the graphical user interface, techniques of this disclosure may reduce the amount of time required to create content filters for each application and may improve filtering by preventing content from getting through to the display of the graphical user interface. Techniques of this disclosure may improve content filtering by "learning" user preferences over time, e.g., by analyzing the filtering context and previous filter user selections. By filtering all content without limitation to one particular type of data or one specific application executed on the computing device and by intelligently selecting content that should be filtered and allowing the user to further input filtering updates at different modes, techniques of this disclosure may provide a better user experience and may reduce the effort required by the user to filter content at the graphical user interface display and reduce the risk of wanted material from being filtered.

FIG. 1 is a conceptual diagram illustrating an example of a computing device configured to execute one or more of filtering content techniques, in accordance with one or more aspects of the present disclosure. As shown in FIG. 1, computing device 10 may be associated with user 2, and includes applications 11A-N (collectively, "applications 11"), filter module 16, and user interface (UI) device 4. In this disclosure, the use of "A-N" with respect to different reference numerals should not be understood to imply that there are necessarily an equal number of items for the depicted components. Instead, the letters "A-N" are used for purposes of illustration only.

Examples of computing device 10 may include, but are not limited to, portable or mobile devices such as mobile phones (including smartphones), laptop computers, desktop computers, tablet computers, smart television platform, watches, smart glasses, personal digital assistants (PDAs), servers, mainframes, etc. As shown in the example of FIG. 1, computing device 10 may be a tablet computer or a smartphone. Computing device 10, in some examples, can include UI device 4, user interface (UI) module 3, filter module 16, and applications 11. Other examples of a computing device 10 that implement techniques of the disclosure may include additional components not shown in FIG. 1.

UI device 4 of computing device 10 may function as an input device for computing device 10 and as an output device. For instance, UI device 4 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UI device 4 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UI device 4 of computing device 10 may include a presence-sensitive screen that may receive tactile user input from a user of computing device 10. UI device 4 may receive the tactile user input by detecting one or more taps and/or gestures from a user of computing device 10 (e.g., the user touching or pointing to one or more locations of UI device 4 with a finger or a stylus pen). The presence-sensitive screen of UI device 4 may present output to a user. UI device 4 may present the output as a user interface (e.g., graphical user interface (GUI) 15), which may be related to functionality provided by computing device 10. For example, UI device 4 may present various functions and applications executing on computing device 10 such as an electronic message application, a map application, etc.

Computing device 10 may include user interface ("UI") module 3 and filter module 16. Modules 3 and 16 may perform operations described herein using software, hardware, or a mixture of both hardware and software residing in and executing on computing device 10. Computing device 10 may execute modules 3 and 16 with multiple processors. Computing device 10 may execute modules 3 and 16 as a virtual machine executing on underlying hardware.

UI module 3 may perform one or more functions to receive data, such as user input or network data, from components associated with computing device 10, such as filter module 16, and send such input to other components associated with computing device 10, such as filter module 16. Using the data, UI module 3 may cause other components associated with computing device 10, such as UI device 4, to provide output based on the data. For instance, UI module 3 may receive data from filter module 16 that causes UI device 4 to display the filtered content at the graphical user interface display at GUI 15. UI module 3 may be implemented in various ways. For example, UI module 6 may be a downloadable or pre-installed application or "app." In another example, UI module 6 may be implemented as part of a hardware unit of computing device 10. In another example, UI module 6 may be implemented as part of an operating system (e.g., operating system 8) of computing device 10.

Filter module 16 may include functionality to perform any variety of operations on computing device 10. Applications 11 may include a text application, photo viewer, social networking service, video application, email application, word processor, spreadsheet, web browser, multimedia player, server application, image capture application, audio application, etc. As described with respect the example of FIG. 1, filter module 16 may include functionality of a filter application that enable user 2 to share objects. Filter module 16 may be implemented in various ways on computing device 10. For example, filter module 16 may be a downloadable or pre-installed application or "app." In another example, filter module 16 may be implemented as part of a hardware unit of computing device 10. In another example, filter module 16 may be implemented as part of an operating system (e.g., operating system 8) of computing device 10.

The term "object" as used herein is a broad term encompassing as its plain and ordinary meaning including, but not limited to, data files, photos, video recordings, audio recordings, documents, graphics, text, websites, and combinations thereof. A file may be adapted to any data that a computing device is capable of capturing, receiving or storing. While this disclosure uses the non-limiting example of an image as a media object to illustrate various techniques of this disclosure, the techniques of this disclosure may be applied to other types of objects and are not limited to images.

As shown in FIG. 1, GUI 15 may include a user interface that allows user 2 to interact with computing device 10. GUI 15 may include graphical content, such as text, images, videos, audio, or any other visually displayable graphical object or audio object. User 2 may interact with GUI 15 to select content to be filtered, and in some examples, to view the different categories of filterable content, on computing device 10. In some examples, the method for filtering out data content on a computing device may integrate directly into the operating system of the computing device. In other examples, the content filter application runs closely with the operating system, but is a separate application that a user may later download. Installed applications 11 must agree to allow their content intercepted by the filter or non-compliance/non-agreement will result in the application being prevented from being installed or run on computing device 10, and in some examples, the applications (or the associated network) must grant permission to access application data.

In one example, user 2 may enable the filter application of computing device 10 by user input at a control (e.g., content filtering switch 22) displayed within GUI 15. When enabled at content filter switch 22, the filter application begins to filter content of all applications 11 running on computing device 10, or only the selected applications of applications 11, and filters graphical content displayed at GUI 15 of computing device 10. The user may also password protect the content filter by enabling a password at GUI 15. In the example of FIG. 1, user 2 may enable password protection of the filter at computing device 10 by user input at a control (e.g., password protect switch 24) displayed within GUI 15. The password protection may limit access to the filter control settings, and in some examples, limit access to viewing filtered content.

In another example, computing device 10 may receive an object, such as an image and text, that is associated with content identifiers in response to a request by an application running on the computing device, such as one of applications 11. The request may be for access to the network of the respective application, or the request may be for data. When running on computing device 10, filter module 16 may determine that one or more of applications 11 receives information from a network. The network may be a service or provider that communicates with one or more related applications, of applications 11, and the related application on computing device 10 may receive information that includes objects. For example, a social media service may send data from the remote network server to the related social media application executed on computing device 10. In some examples, computing device 10 receives the data in response to a request sent by the corresponding social media application of applications 11. In other example, the information is sent automatically based on the network or application settings. The received information may contain an image and some text describing the image for updating the social media news feed on user 2's social media account. Filter module 16 may intercept the social media image(s) and text before the social media application of applications 11 receives the data. Receiving the data prior to the social media application allows filter module 16 to determine if the received data includes content for filtering.

The image(s) and text received by computing device 10 may have data about the graphical display of the object or associated data with the object, all of which may be content identifiers. For example, the image or text file itself may be the object, and in some examples, the object may also include associated data, such as meta data and other content and contextual data (e.g., the number of bytes required to store the image, the time and date that the image was taken, file name, the object source, the geographic location at which the image was taken, the current location of computing device 10, textual or graphical tags associated with the image, object recognition data associated with the image, display data, etc.). Filter module 16 may use the data (e.g., object data and associated data) to identify content that the user is likely to filter from the graphical element for display at GUI 15. All data directly or indirectly associated with the object are content identifiers, which help the filter application determine if the object should be filtered.

In one example, filter module 16 may determine a respective weighted probability for the received object that is based on an indication of selected filter criteria. The weighted probability may, in one example, correspond to a likelihood that user 2 would like to filter the received object from the graphical element display, and in this none limiting example, an image from a newsfeed of a social media application. In one example, when user 2 configures the settings or updates the settings of filter module 16 to filter specific content from the display of GUI 15. For example, user 2 may select words associated with content that user 2 wants to filter. The words may appear in a list at GUI 15 (see, e.g., FIG. 6 where the box marked "War" 230 has a check indicating including any content related to "war" in the filter). In one example, applications 11 may be a social media application, and send a request to the network for updating the news feed viewable to user 2 on GUI 15 (e.g., FIG. 3). In response to the data request, computing device 10 may receive data containing content identifiers. In one example, filter module 16 of computing device 10 may intercept (i.e., first receive or analyze) the data, before received by the recipient social media application, using standard protocols like HTTP, HTTPS, etc., used by applications 11 to intercept incoming network traffic. However, the received content identifiers may not only be in response to data requests. Filter module 16 may determine that the content received by computing device 10 contains content that user 2 is likely to want to filter from the display of GUI 15. For example, computing device 10 may receive data intended for the social media application that contains an article, including an image and accompanying text about violent activity in a war zone area. Filter module 16 is set to filter content related to "War" as indicated by user 2 (see, e.g., FIG. 6 where the box marked "War" 230 has a check, indicating that the filter includes any content related to "war" in the filter). This example uses an image as the received object, but filter module 16 may apply to additional object types, such as video, audio, etc.

Filter module 16 may determine that the image and article about war received by computing device 10 may match the selected filter settings or likely related to the item selected in the filter settings. Filter module 16 may use different techniques to determine if the content received may be content that user 2 would likely filter. In one technique example, filter module 16 parses and pattern matches the data of each intercepted against the configured criteria, e.g. "war" in this example. In this example, when filter module 16 determines that there is a likely match, then applicable discrete blocks are reconstituted to have a similar format, but without the content that contained the matched keywords. Text based matching may incorporate standard text parsing and matching, however, image and video matching mandate more sophisticated techniques, such as machine learning algorithms or human interaction in the matching and determination process. In one example technique, object identification may be used to identify objects in the image, phono, video, etc. In some cases, filer module 16 may identify key objects, or objects within object, and determine a match with the filter criteria. In the example of audio, sound patterns may be identified as matching the filter criteria, such as a person saying the word "war" or the sound of gun fire or explosions. In other example techniques, content identifiers may be identified and used, such as file type, source information of image or news feed, originating web address, URL, meta data, date received or image was created, title, object context such as geographic information, associated data such as data from the network (e.g., comments from other users about the image, other social media postings about the image, etc.). In other technique examples, filter module 16 may perform dynamic categorized content filtering, or a combination of heuristic and pattern matching algorithms to automatically determine, without input from user 2, other words or variations to expand the filter criteria for broader and improved content filtering. In other examples, the categorized content may use a master list of words or a sub-list of associated terms that may contain alternative terms. The mater list or terms may be a predetermined list or terms associated with a topic or a list based on user input. Similarly, the sub-list may contain predetermined terms or user input terms. The sub-lists may each be associated by pattern or category to at least one of the terms of the master list. The master list, or lists, and the sub-lists may be stored locally on computing device 10 or on a remote server associated with and accessibly by computing device 10.

Filter module 16 may consider other factors in determining the likelihood of user 2 likely filter the content. For example, user input, such as frequently identified content to filters, may be recently identified, or may be relevant to a context of computing device 10 (e.g., a location, time of day, currently executing application, etc.). For example, an employee may not want to watch cat videos while at work and may only interact with social media in limited ways and with only a few specific people. Additionally, filter module 16 may also use user input to determine selecting the content or object to be included or not included.

Filter module 16 may intercept objects from one or more of the filter available on computing device 10 as suggested filter. Filtering may include the filter settings criteria that filter module 16 determines that a user would likely filter from the respective application, such as a war photo in a newsfeed. In some examples, one or more of applications 11 provide content identifiers and user preferences that filter module 16 may use in determining to filter the any portion of, or all, of the content of the object received. Other applications, websites, services, etc. provided by other computing devices communicatively coupled to computing device 10 (e.g., using a computer network) may provide additional filter criteria expansion and filter functionality not provided by applications 11, but which can provide data for filtering by filter module 16 for presentation to user 2 as content filtering.

All of which may use probabilities association with "war" as selected by user 2 in the filter settings of filter module 16. Filter module 16 may select content to filter based on a weighted probability calculated for each object received by computing device 10. The weighted probability may, in one example, correspond to a likelihood that user 2 will select the respective object for filtering content, excluding the object from the display of the graphical element at GUI 15. Calculating weighted probabilities as describing this disclosure may use algorithms and calculations known in the art.

In another example, the computing device may determine a graphical element based on the weighted probabilities and the selection. Filter module 16 may determine a weighted probability that indicates a probability that the user may likely filter the object from the graphical element of the respective application based on the filter criteria. The computing device may base the weighted probability for the object on information about the object being shared, characteristics of each content identifier, associated application characteristics, and a context of the filter settings of the computing device. In generating the weighted probability, filter module 16 may be configured to more heavily weight certain factors, such as prior user filter criteria selections, than other factors, such as the time of day.

Filter module 16 applies weighting factors to each piece of information included in the weighted probability calculation and generates a weighted probability for each of the available filter. For example, the information about the object being shared may include a type of the object, a size of the object, content associated with the object, previous filter selected by user 2 when filtering a similar object, etc. The characteristics of each application may include privacy controls provided by each application, a type of object the filter application is configured to filter, content normally viewed on the application, file size limitations imposed by the application, among other characteristics.

Responsive to determining the weighted probability for each of the filters, filter module 16 may refrain from selecting content having a respective weighted probability value greater than a threshold value, excluding the object from a graphical element of the respective application displayed within GUI 15. In one example, the threshold value may be a configurable threshold determined prior to filter module 16 determining the weighted probability values for each content identifier. In another example, the threshold value may be dynamically determined based on the calculated weighted probability values such that only the top three, five, or some other configurable number of filter that have weighted probability values that meet or exceed the threshold value.

In one example, determining the filtered content is based on a threshold that may be based on a predetermined value. Preference determination module 12 may set the value. The value may be a specific numerical value based on the weighted probability. The threshold may be based on a percentage of the weighted probability. Alternatively, the threshold may be a specific number of the "top" weighted probability values, for example, so the top three weighted probability values are selected. In another example, selecting the object may be based on weighted probability by comparing a degree of similarity between the content identifiers the object and one or more characteristics associated with the respective application. When the weighted probability is greater than the threshold, computing device 10 selects the respective object for filtering, refraining from including the object in the output at the graphical user interface. When the weighted probability is not greater than the predetermined value, computing device 10 may select the respective object for output at the graphical user interface.

In one example, outputting, by computing device 10 and at GUI 15 of computing device 10, the graphical element. Filter module 16 provides the filter determination of selected content information to UI module 3 and UI module 3 outputs an updated user interface (e.g., GUI 15) for display at UI device 4. Responsive to receiving a selection of a filtered graphical output, the corresponding application, such as a sharing service, intended to receive the filtered object, prior to interception, shares the object (e.g., image 110 of FIG. 3). Filter module 16 receives an indication of the selection and stores information about the selection for later retrieval and inclusion in determining weighted probabilities for the next time content is filtered, and a probability score is generated by filter module 16. Because the filter application may be part or closely running with the operating system, the specific application may not be substantially slowed or interrupted in generating the updated filtered display.

Depending on the user indicated settings, there may be multiple modes available for viewing the graphical element. For example, filter module 16 may have a first mode, or a standard mode, where GUI 15 displays content that does not include filtered content. Instead of the filtered content, GUI 15 may include (e.g., FIG. 3) an area where the object may have been displayed, had the content not been filtered, and instead displays a message indicating that the object (or part of the object) was filtered. There may be a graphical button or display where user 2 may input, indicating to "show" or display the filtered content. Filter module 16 may also have a second mode, parental/corporate control, where content cannot be viewed. In the second mode, a passcode or access code may be entered to access the user account so that the filtered content can be viewed. (e.g., FIG. 3 for example of the second mode).

Computing device 10 may save the filtered objects. Storing the objects may be locally, such as in the filter application or in the application associated with the filtered graphical element, or in a remote server, such as the filter application network or in the network of the respective application of applications 11. Stored objects may be used for later determinations of weighting probabilities for filtering content of applications. In other examples, filtered objects are not stored on any device or network.

Computing device 10 may filter content using filter modules stored within computing device 10 or content may filter using remotely stored modules on remote servers communicating with computing device 10. The remote devices may filter content and send the resulting display to computing device 10 for viewing by the user. In another example, computing device 10 may have different filter modules that run at least one type of filtering technique in analyzing the different types of content or each module may analyze a specific type of data to determine if the content of a particular data type likely contains filterable material. Each module may send the filtered content to a central filter module or a display module for determining the display using the received determination of each of the filter modules.

Figure 2:
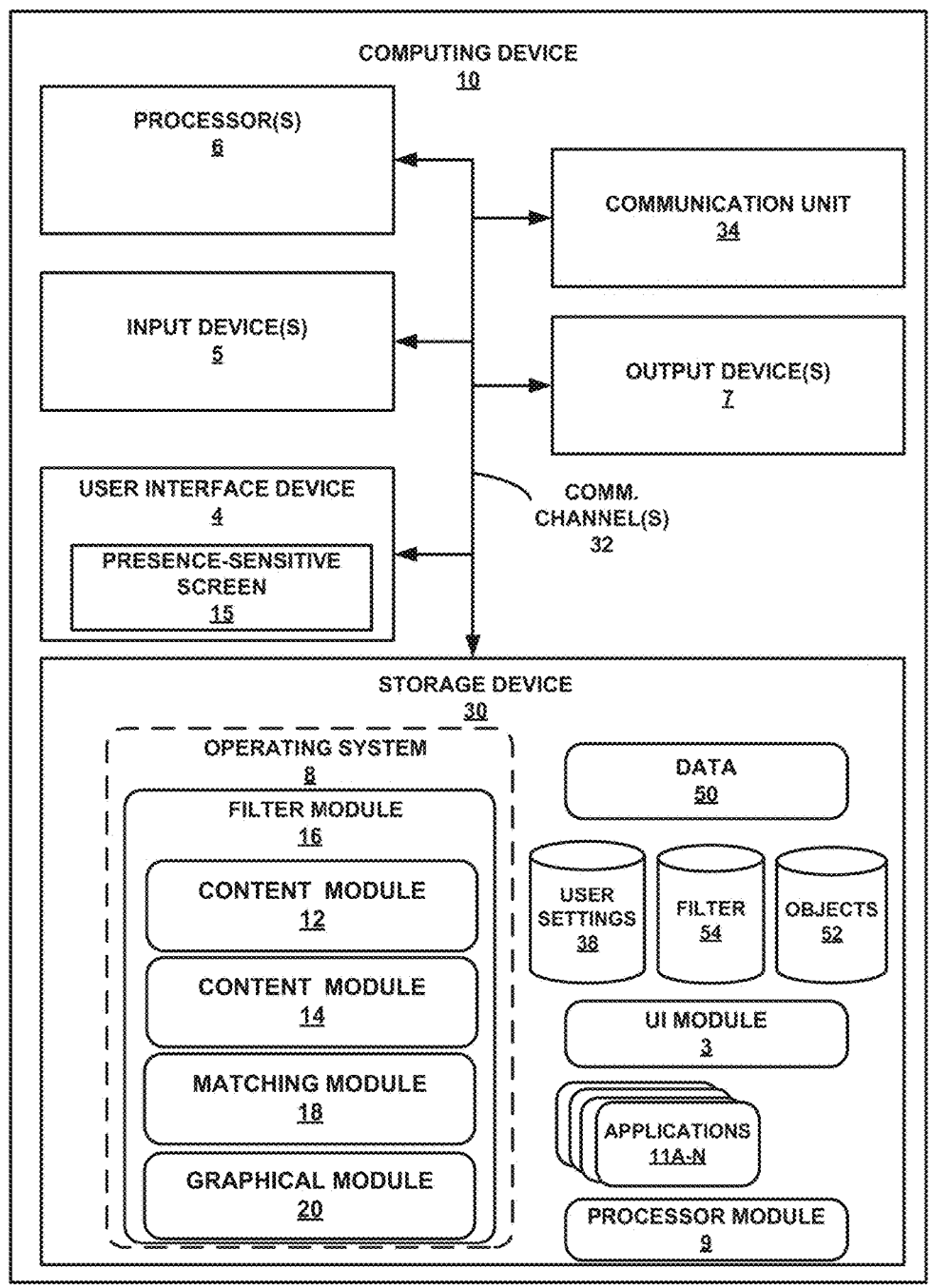
FIG. 2 is a block diagram illustrating an example of a computing device for filtering content, in accordance with one or more aspects of the present disclosure.

FIG. 2 is a block diagram illustrating an example of a computing device for filtering content, in accordance with one or more aspects of the present disclosure. Computing device 10 may contain a storage device 30 may include a volatile or non-volatile computer readable storage medium that is able to store such as software programs and data to implement the functionality of the lane determination system. In some examples, storage device 30 may include non-volatile storage elements, such as magnetic hard discs, optical discs, floppy discs, flash memories, or forms of electrically programmable memories (EPROM) or electrically erasable and programmable (EEPROM) memories. For example, storage device 30 may include Random Access Memory (RAM), Read Only Memory (ROM), flash memory or any other form of long term or short term memory, although without limitation thereto. In some embodiments, the memory may also include hard disk drive, floppy disk drive, tape drive, secure digital (SD) card, digital versatile disc random access memories (DVD-RAM), or any other appropriate form of computer readable storage medium. Processor(s) 6 is operably connected to a communication unit 34, an input device 5, an output module 7, a user interface (UI) device 4 that includes a presence-sensitive screen 15, storage device 30 and communications channel(s) 32. Processor(s) 6 may also be connected to other modules/devices (not shown) within computing device 10 or connected externally via an appropriate interface. Processor(s) 6 may include, but not limited to, microprocessor unit, graphical processor unit, digital signal processor or any other appropriate processors that have the capability to execute computer program instructions on data to produce the expected output. A processor module, such as processor module 9, may run processor(s) 6 and may include a plurality of components from a list including registers, buffers, control logic, data lines, arithmetic logic unit (ALU), floating-point unit (FPU), and other appropriate components for performing operations including arithmetic, logical, control, input, and output specified by the instructions in a computer program.

Computing device 10 may also include hardware and/or software modules including antenna to communicate wirelessly to the Internet, a camera device to capture photo and video, a microphone to capture audio, a call managing module may provide the required functionality to make and receive telephone call, short message service (SMS) module to send and receive SMS, a media player module to play multimedia content (for example: music and movie), and an Internet web browser (for example: Firefox and Google Chrome). Computing device 10 may also have additional applications installed such as calculator, games, calendar, text editor, and other appropriate application programs.

In preferred embodiments, storage device 30 may include a filter module 16, which may execute machine instructions or computer instruction to produce an output on output device 7 or send data to a peripheral device interface or other appropriate interfaces, and may use one or more of processor (s) 6, which may be one or more from a list including single processor, multi processors, single-core, and multi-core processors. Processor(s) 6 may execute machine instructions or computer instructions to produce an output on output device 7 or send data to a peripheral device interface or other appropriate interfaces. In alternative forms of a user device, a plurality of hardware processors, types of memory, and data busses (not shown) may be present. Filter module 16 may include filter settings 12, content module 14, match module 18, and graphical module 20. Graphical module 20 may send filtered output graphical display data to UI module 3 for displaying the filtered content of the application at presence-sensitive screen 15. In some examples, presence-sensitive screen 15 is output device 7.

In another embodiment, filter module 12 may receive user input through one or more of input device(s) 5, such as touch screen, audio, visual, keyboard, and other haptic based devices. The filter module 16 may execute instructions that include program instructions stored in memory within the user device (e.g., user settings 38, filter 54, or objects 52), stored externally, or transmitted by means of radio waves or electromagnetic waves. Filter module 16 may retrieve device data from data 50, which is a data store for computing device 10.

Filter settings 12 may receive user input at user interface device 4, indicating enabling the filter application and enabling password protection for the filter application. Passwords for accessing filter module 16 and user selection of filter criteria (e.g., words, topics, and other basis used for determining filter content) may be stored in user settings 38. Filter settings 12 may also indicate the user selected applications of applications 11 that filter module 16 applies the content filter to when executing the filter application. Filter settings 12 may also display at user interface device 4 lists of words representing filter topics, which are stored in either user settings 38 or filter storage 54. Any additional filter terms or data entered at the user interface device 4 and received by filter settings 12. Filter settings 12 may run dynamic categorized content filtering, including algorithms, to expand on words entered by the user or to expand and update stored filter criteria in filter module 16 or in filter storage device 30. Dynamic categorized content filtering is automatic and does not require additional user input. It may be done on computing device 10 or by a remote server that updates filter module 16. The results of dynamic filtering are stored in storage device 30, for example at filer 54 or filter settings module 12. Word expansion and associations broaden the scope of the filter, improving accuracy by automatically expanding the filter criteria. Filter settings 12 may communicate with a network to determine additional data as criteria for matching and determining content. Filter module 16 may send the filter settings to content module 14.

Filter setting 12 may, in some examples, determine filter criteria based on stored data associated with applications 11. For example, filter module 16 may find in applications 11 filter preferences for a respective application, filter settings, or application usage, that may contribute to filter criteria for filtering content.

When a user enables filter module 16 on computing device 10, content module 14 may detect that at least one of applications 11 sent data requests to the wireless network or other appropriate communication network through communication unit 34. In response to the request(s), communication unit 34 may receive data for updating the respective application of applications 11. Communication unit 34 may send and receive data from communication unit 34 via communications channel(s) 32, sending and receiving data to the respective application of applications 11 associated with the communicated data. Applications 11 may also connect to a communication unit 34 to establish an appropriate wireless connection to a network or a remote server associated with the respective application. Communication with a remote server via the wireless network or other appropriate communication network (e.g., Wi-Fi, a peer-topeer connection such as BLUETOOTH or Wi-Fi Direct, or other appropriate form of connection) through communication unit 34. Further, processors 6 connect to appropriate storage device 30 through filter module 16 to store and retrieve data. Computing device 10 may be connected to external devices through wired or wireless connection as appropriate. Communication unit 34 may provide the required interface including signal processing (non-limiting examples: analogue and digital signal processing) to communicate with a server system. Computing device 10 may communicate through one or more communication technologies including cdma2000, WCDMA, WiMAX, Wi-Fi, Wi-Fi Direct, BLUETOOTH, GPRS, 3G, 4G, LTE, satellite based communication, and other appropriate communication technologies that will be known to an ordinary person skilled in the relevant art. Filter module 16 may detect communication of applications 11 and data exchange that use one or more protocols including Internet Protocol (IP), hypertext transfer protocol (HTTP), hypertext transfer protocol secure (HTTPS), and any other appropriate protocols. Computing device 10 may also connect to other computing devices using hard wiring as well, such as Universal Serial Bus (USB) or other wired connections. Computing device 10 may include mechanisms to identify the current location of the device using known techniques.

Applications 11A-N may be any type of application downloaded on computing device 10, such as social media, news sources, banking, travel, gaming, weather, image collections, etc. and may allow the user to access content of the respective application through user interface (UI) device 4. Each respective application (such as application 11C) of applications 11 may grant access or permission to filter module 16, allowing access to the respective application's content and network. When filter module 16 has access to at least one of applications 11, then content module 14 may intercept incoming data intended for that particular application and determines the content of the object received. The objects received may be intended for a specific application of applications 11. The object may be a file (e.g., image, audio, video, text, graphic, photo, document, in any standard, 2-D, 3-D or virtual reality format). Content module 14 may use the file type as well as any accompanying data associated with the object to determine the content of the object. communication unit 34 may receive data for updating the respective application of applications 11. Communication unit 34 may send and receive data from communication unit 34 via communications channel(s) 32, sending and receiving data to the respective application of applications 11 associated with the communicated data. Content module 14 may determine or identify other factors that may provide additional content identifications not provided by the objects received by computing device 10. For example, filter module 16 may find in applications 11 stored data regarding stored associated with similar objects.

Content module 14 may determine content identifiers. Content identifiers may be data that make up the object (e.g., file type, source, objects within the file, etc.) or it may be associated data, such as object source, metadata, associated website or service, contextual identifiers of computing device 10 at the time of receiving the object, application preferences and setting, geographic data, application usage, etc.). Once the content identifiers are identified, content module 14 may communicate with match module 18 to compare the content identifiers with the filter settings.

Filter module 16 may also include match module 18. Match module 18 may perform computations based on stored instructions, which may be stored internally at computing device 10 or externally at a remote server. Match module 18 may perform basic string matching techniques to determine if content filter identifiers associated with an object match filter criteria. String matching techniques may include matching the word, part of the word, or patterns with those stored in filter 54. Match module 18 may perform matching techniques on the different parts of the object, for example such as object recognition techniques to identify sub-objects within an object, or the object, as a whole, to determine content identifiers. In other examples, match module 18 may perform other, sometimes complex, techniques for determining if content should be filtered. For example, match module 18 may perform computations to determine a weighted probability for the objects intercepted by filter module 16. Match module 18 determines the weighted probability for each object, or sub-objects or content within an object, intercepted by content module 14. Weighted probabilities indicate a probability that the user may likely select a respective content to so filter associated with the object. The computing device may base the weighted probability for each object on information about the object being filtered, characteristics of each application, and a context of the computing device. In generating the weighted probability, filter module 16 may be configured to more heavily weight certain factors, such as prior user filter settings of a selection to unfilter (i.e., to include in the graphical display in the graphical element at presence-sensitive screen (GUI) 15) a specific object, more than, for example, metadata associated with the date of a received object. In some examples, match module 18 may also access data from applications 11 to determine any user preferences set in a specific application of applications 11. Match module 18 may access user preferences based on user input and content identifiers.

Match module 18 may update the weighted probability based on user input, or user indication to include it in the filter. For example, when the user indicates including an object in the graphical display by pressing the "show" graphical button on the graphical display. Probabilities may also automatically update with data received, such as dynamic categorized content filtering, from the network. Computing device 10 stores updated probability data in storage device 30, such as with the objects 52 storage.

Graphical module 20 receives data from matching module 18 regarding the determination of what content, if any should be filtered. GUI 15 may include a user interface that allows user 2 to interact with computing device 10. GUI 15 may include graphical content, such as text, images, videos or any other visually displayable graphic object. User 2 may interact with GUI 15 to share objects with other users. Graphical module 20 may receive data from filter settings 12 regarding layout format for the filtered graphical content. For example, if filter settings are set to run in a first mode, then graphical module 20 may display the filtered content with a blank are where the content was. Graphical module 20's determination of the graphical display is then sent to applications 11, for displaying the filtered content of the respective application of applications 11.

In some examples, graphical module 20 may use user gestures to determine the display of content. In this example, UI device 4 may detect a touch gesture (e.g., a tap, a swipe, etc. by the user) at a location of UI device 4 that displays filtered content or an indication to show the filtered content. UI device 4 may detect the touch gesture and, in response, a UI module 3 (for example in data 50) may determine whether the touch gesture is at a location associated with one of the graphical buttons indicating to display the filtered content. When the touch gesture is within a specific location or predetermined distance of one of the identified displays, UI module 3 may cause UI device 4 to execute a change in the display of the graphical display, and in some instances, update the weighted probabilities associated with the displayed object in a specific application.

User input data may be used to produce a graphical element that may be presented to the user (e.g., graphical elements may be displayed on screen, audio, and multimedia) or sent to an interface module (e.g., network interface, user interface, sensor module or another appropriate control module). In an embodiment, the processor module may be implemented as a single chip or multiple chips that may include plurality of digital and analogue processors. User input selecting the object to be filtered or not filtered, received content identifiers (e.g., file type, source, objects within the file, source, metadata, contextual identifiers of computing device 10 at the time of receiving the object, application preferences and setting, geographic data, application usage, etc.).

Figure 3A:
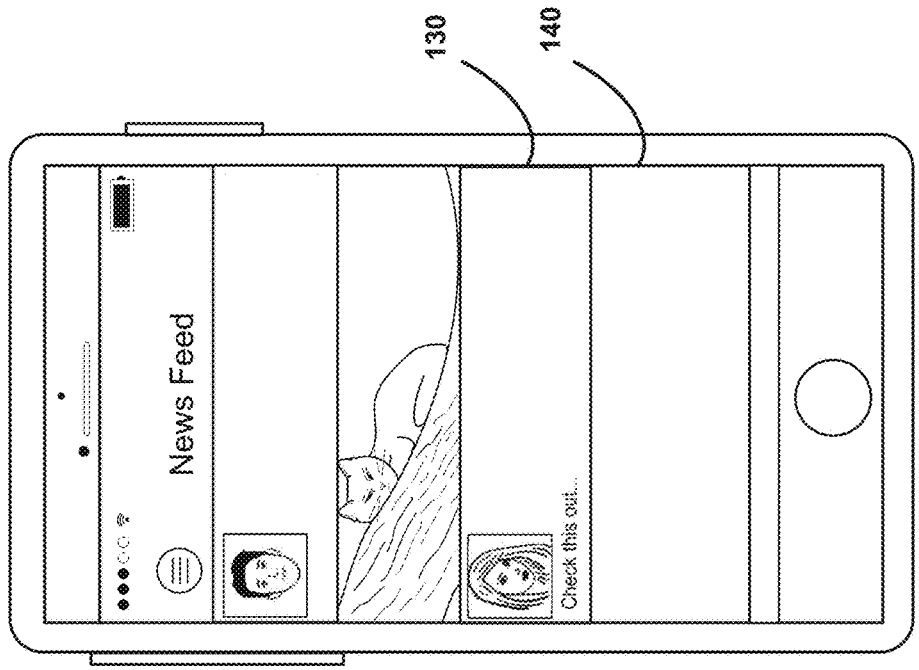
FIGS. 3A&B are conceptual diagrams illustrating an example graphical user interfaces that includes filtered content, in accordance with one or more aspects of the present disclosure.

FIG. 3A is a conceptual diagram illustrating an example graphical user interfaces that includes filtered content. In the example of FIG. 3A, the computing device shows a graphical element from one executed social media application, as one example from a plurality of applications. The social media application of FIG. 3A grants permission to the filter application for accessing the network and data associated with the social media application, such as sent objects, such as a news feed update with an image and text, sent from the network and received by the social media application on the computing device. The filter application intercepts an object intended as an update to the new feeds feed of the social media application. After the filter application determines that the object intercepted contains a match with filter criteria, then the filter application may tag or send an indication to the social media application that the object is a "match" with filter criteria. The social media application may then remove the matched object from the determined graphical element. In other examples, the filter application may determine the graphical element configuration without the matched object and send the configuration to the social media application. In either example, the configuration may not include the matched object from the determined graphical element for the social media application.

The graphical element may have different settings that determine the configuration or layout of the graphical element. For example, in a standard format, the social media application may replace the object indicated as a "matched" object (i.e., filter the object by not including it) with a notification to the user 110, such as "Content has been filtered," that informs the user that an object was filtered and not included in the graphical display. In the example of FIG. 3A, a graphical button "show" 120 is present. The user may tap on graphical button "show" 120 to display the filtered content by appearing on the display where the notification was, in other words, where the object would appear if the filter was not enabled or not present. In another example, the computing device may replace the filtered object with another object of the social media application. In this example, the display does not contain an indication to the user that anything was filtered. Instead, the social media application (or in other example the filter application) may order the objects to be displayed and the filtered object would not appear in the ordered list (or the filter object would be too low of an order place to display the object). For example, the social media application of FIG. 3A may order the objects by date of last update to the object, so that the objects would be posted in chronological order, including updating the date of the object when another user "likes" or comments on the object or the object's content. The social media application would remove the filtered object from the chronological order of the social media objects in the graphical element.

In another example, the content filter application may have different modes. The first most may include displaying at the graphical user interface the indication of filtered content 110 with the graphical button "show" 120. The display of content. In this example, presence-sensitive display may detect a touch gesture (e.g., a tap, a swipe, etc. by the user) at a location of presence-sensitive display that displays the graphical button "show" 120. The presence-sensitive display may detect the user taping the button, or a touch gesture. When the computing device determines that the touch gesture is within a specific location or predetermined distance of one of the identified displays, the filter application may cause the graphical element to change to include the filtered content. When the user indicates seeing the filtered content with a gesture, the computing device may update the weighted probabilities associated with the displayed object in a specific application, so that the weighted probability reflects the user likelihood of viewing the content instead of filtering the content.

In a second mode, the filter application may have a parental setting or an employer setting, where the graphical button 120 may not be displayed, or may be inactive, and filtered content could not be viewed. In the example of the second mode, filtered content may be viewed after a user inputs account access information (e.g., a password, biometric, pin, etc.). In the example of the second mode, the filtered content may not be viewed at all and other objects may replace the filtered content. In this example, the filtered content may be viewable only after the user or an account administrator enters account access information.

When the object is filtered, the filter application may display only a portion of the object that "matches" filter criteria in the graphical element, or may display the entire object. For example, a news feed item on the social media application may have multiple headlines about different articles. The filter application may filter the headlines about "War" and include the other headlines about celebrities and sports, unless there is as association with war and the headline. The graphical element displays the headlines, except the headline about war, in the newsfeed of the social media application. However, if the filter application filters the entire object based on the filter configuration and settings, then none of the headlines would appear in the graphical element. The space would include an indication that content was filtered, or the space would include a different news feed content that replaces the filtered headline feed.

Figure 3B:
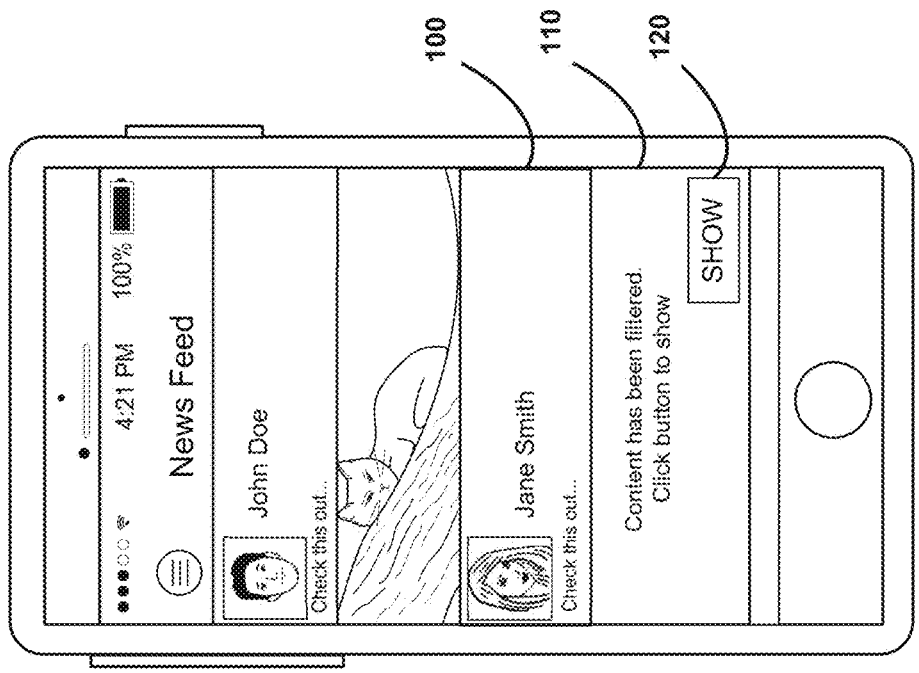

FIG. 3B is a conceptual diagram illustrating an example graphical user interfaces that includes filtered content. In the example of FIG. 3B, the computing device shows a graphical element from one executed social media application, as one example from a plurality of applications. The graphical element of FIG. 3B may be different from FIG. 3A, because it does not include an indication of filtered content nor does it allow the user to view the filtered content 140 (e.g., press the "Show" button). Instead, the filtered content is just left out from the graphical element, appearing as an empty space where the filtered content otherwise would appear. This example may illustrate a parental or business mode of the filter application where users would not be able to view the content filtered by the application.

In some examples of FIG. 3B, the graphical element display may replace the empty area of the filtered content with another social media notification. For example, not displayed in FIG. 3B, the notification from Jane Smith 130 may be replaced with a second notification from John Doe or another contact of the social media application. The graphical element may have different settings that determine what content is included in the graphical display element displayed at the graphical user interface or if the user may view the filtered content.

Figure 4:
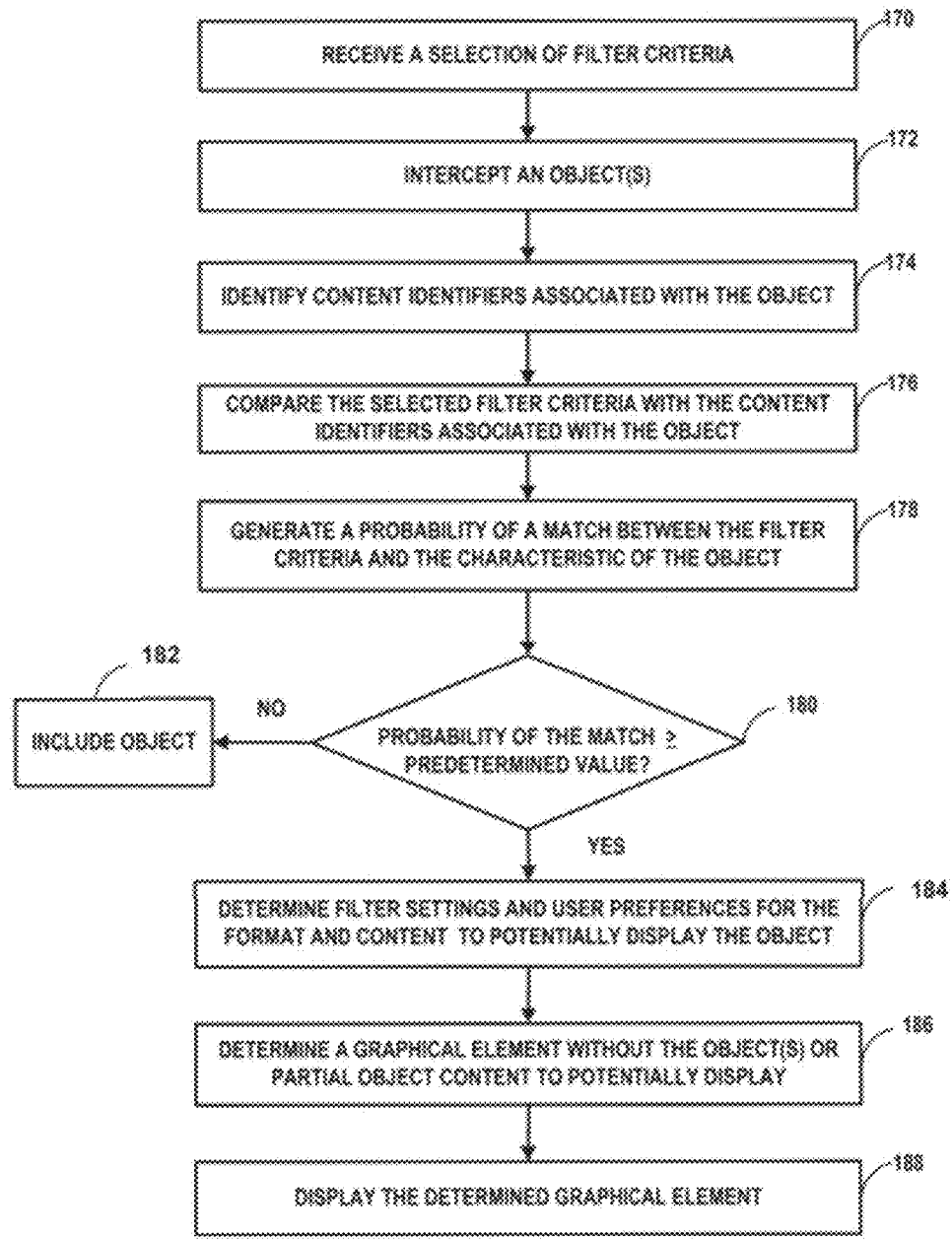
FIG. 4 is a flowchart illustrating an example operation for managing the selection and display of filtering content, in accordance with one or more aspects of the present disclosure.

FIG. 4 is a flowchart illustrating an example operation for managing the selection and display of filtering content, in accordance with one or more aspects of the present disclosure. For the purposes of illustration only, the example operations are described below within the context of claim device 10 as shown in FIGS. 1 and 2.

In one example, computing device 10 may receive a selection of filter criteria (170). A selection may be a selection of predetermined filter criteria by a user or an input filter criteria by the user. Filter criteria may also be automated dynamic categorized content filtering, or other automated techniques that do not require user input. Filter module 16 of FIG. 2 may intercept an object (172), such as an image, text, video, graphic, sound, etc. After an object is intercepted, identify content identifiers associated with the object (174). Match module 18 may compare the selected filter criteria with the content identifiers associated with the object (178). If a match does not exist between the filter criteria and the content identifiers associated with the object, then match module 18 may determine whether a probability exists for each content identifier associated with the object. Match module 18 may generate a corresponding matching score, or probability, representing the likelihood that user 2 would include the respective object in the content filter (178). In some example, a probability may be a value in a range between 0-1. In some examples, a probability may be initialized to a value of 0.5. In one example, match module 18 may generate a probability of match between the respective filter criteria and the object. In another example, match module 18 may determine the probability based on a comparison of probabilities determined for previously filtered content with the same respective application and based on the respective applications settings, including filter settings.

Match module 18 compares the determined probability value to a threshold value. In some examples, when the probability of the match is greater or equal to the predetermined value, then match module 18 may determine that the object likely contains filter content (180). In other examples, graphical module 20 may compare the value to the probability of the match (180). If the probability of the match is less than the predetermined value, then the likelihood of the user wanting to include the object or its content in the filter is low ("NO" branch of 180) and the object would likely not contain filter content. In this example, graphical module 20 may include the object as part of the graphical element (182), for example, similar to a graphical element without the application filter. In a different example, when the probability of the match is greater or equal to the predetermined value, then the object or its content may likely include content that the user would likely filter ("YES" branch of 180). In this example, graphical module 20 may refrain from including the object in the graphical element ("YES" branch of 180). Graphical module 20 may receive data regarding filter settings, such as set in filter settings 12, and other user preferences (184). Graphical module 20 may use this data to determine the layout for the graphical element (186). For example, if the user has set the filter settings to a first mode, allowing the user to view the filter content, then graphical module 20 may replace the filtered object with a notification that the content has been removed and a graphical button to view the content. Based on the graphical layout determination by graphical module 20, computing device 10 displays the graphical element for the respective application of applications 11 (188). In other examples, filter module 16 may filter only part of the object, for example objects within an image (in other words, sub-objects within an object), if those sub-objects likely match filter content, but the photo does not match. In this example, the none filtered portion of the object, or photo, may become part of the graphical element (186). Graphical module 20 sends the graphical element data, such as layout, objects, etc., to the UI device 4 for display, in accordance with the filter settings, in the graphical element of the respective application of applications 11 on computing device 10 (188).

By setting a threshold value, matching module 18 may select filter content identifiers to improve the accuracy of the content filter preferences. In some examples, matching module 18 may order content identifiers associated with the objects based on the probability value. Matching module 18 may determine filtering of the object based on the ordering of the content identifiers.

Figure 5:
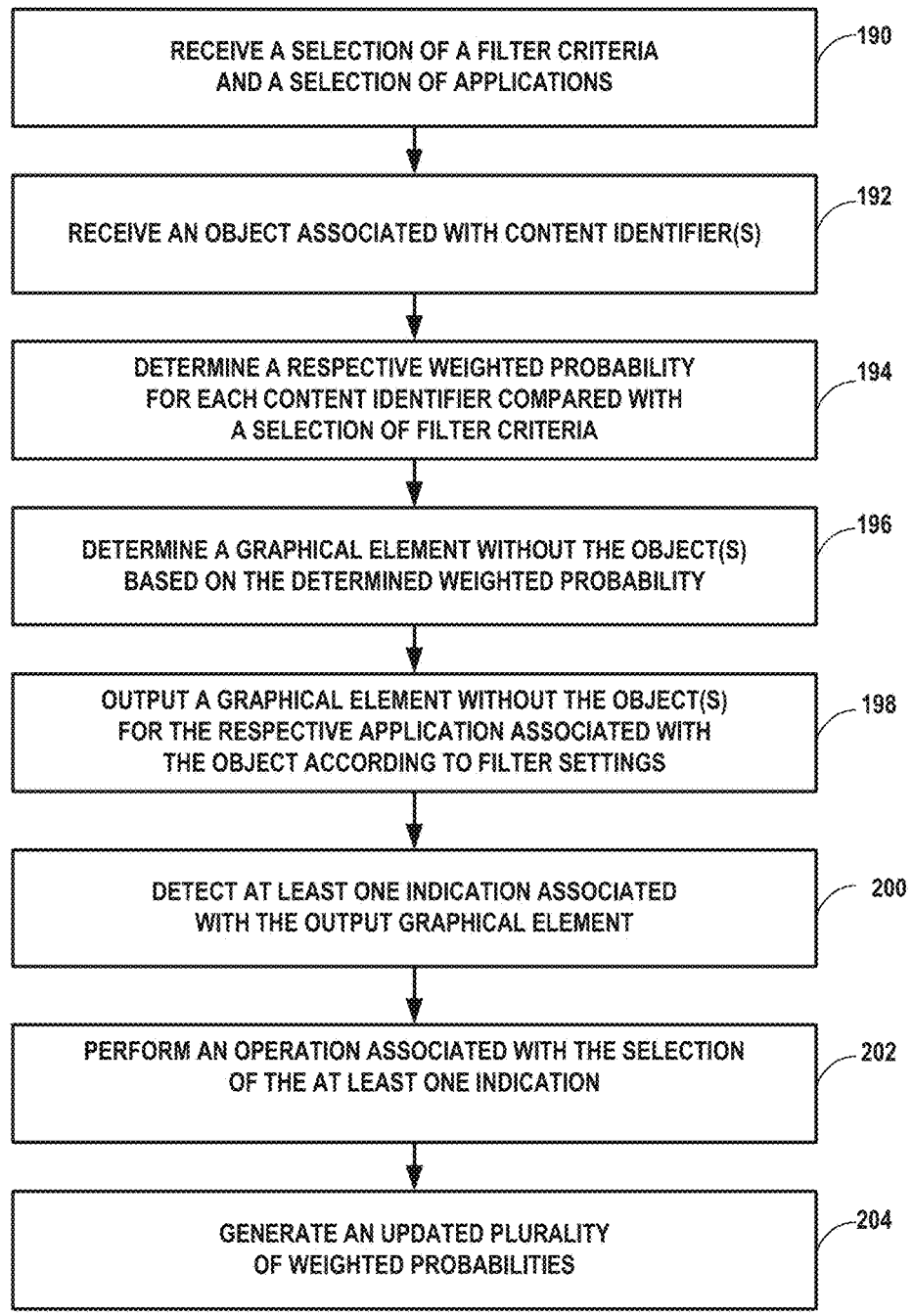
FIG. 5 is a flowchart illustrating another example operation for managing the selection and display of filtering content, in accordance with one or more aspects of the present disclosure.

FIG. 5 is a flowchart illustrating another example operation for managing the selection and display of filter content, in accordance with one or more aspects of the present disclosure. For the purposes of illustration only, the example operations are described below within the context of claim device 10, as shown in FIGS. 1 and 2. FIG. 5 is an example of the process for machine learning for computing device 10 at a general level and updating weighted probabilities.

In one example, computing device 10 may receive a selection of filter criteria, when the user selects filter terms to use as filter criteria. The user may also select at least one application, from a plurality of applications on computing device 10, to apply the filter application to and a selection of applications (190). An filter application may intercept a received response from a network associated with one of the applications executed on computing device 10 and intended for the respective applications. The response may contain an object, such as an image, photo, document, text, audio, etc., and associated meta data or any data that may help identify the content of the received object (192). Based on these content identifiers, filter module 16 may determine a respective weighted probability for each content identifier compared with the selection of filter criteria (194). Determine a graphical element without the objects(s) based on the determined weighted probability (196). Output a graphical element without the object(s) for the respective application associated with the object according to filter settings (198). The graphical element uses user setting to determine the output, such as if filter module 16 is running in a specific mode. For example, in a first mode, filtered content may be replaced with a notification in the graphical element of the respective application, indicating filtered content and including a graphical button for showing the filtered content. Computing device 10 may detect an indication, such as a gesture, at the graphical user interface (200). In one example the user may tap the graphical button, causing computing device 10 to run operations that change the graphical element, so that the graphical element displays the filtered content as if it was not filtered (202). Once reviewed, the user may leave the filtered content in the graphical element of the application. Filter module 16 may interpret this as "unfilter" the specific content returned to the graphical element of the respective application (202), and responsively decrease the weighted probabilities associated with the filtered content (204). In other examples, after viewing the filtered content, the user may update the filter criteria by entering additional terms or filter criteria (200). Filter module 16 may update and store the filter criteria (202) and may perform dynamic filtering to expand the entered terms to include other words and association with the entered filtered criteria (202). In one example, filter module 16 may determine that the entered filter criteria is similar to the other filter criteria terms, and interprets the entered filter criteria as confirming that the content should be filtered (202). Filter module 16 updates the weighted probabilities of the filtered content by increasing their respective values (204). Computing device 10 may store the generated weighted probabilities, either increased or decreased, for future use in filtering content.

Figure 6A:
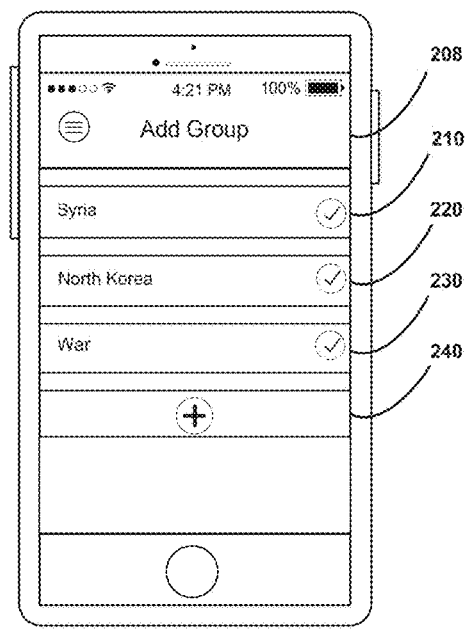
FIGS. 6A and B are conceptual diagrams illustrating an example graphical user interface that includes selected filter criteria for filtering content, in accordance with one or more aspects of the present disclosure.

FIG. 6A is a conceptual diagram illustrating an example graphical user interface that includes selected groups of filtered content, in accordance with one or more aspects of the present disclosure. In the example of FIG. 6A, the display may show a list of words identifying a topic or groups associated with criteria for filtering under the heading "Add Group" 208. For example, "Syria" 210, "North Korea" 220, and "War" 230 are listed as topics to filter. The words listed in FIG. 6A may be predetermined and saved in the filter application or they are created by the user through input at the graphical user interface. In other examples, the user may enter these terms to be used as filter criteria, or may enter additional topics or groups to be added under "Add Groups" 208. The user may add additional groups, which the application uses as criteria for filtering, for example, by tapping on the "add" button 240, causing a graphical keyboard or other user entry control to appear on the display. A graphical keyboard or other input tool may appear (not shown in FIG. 6A), allowing the user to input text, emojis, audio input (such as dictation or voice command), or other input to use as filter criteria. The filter application will then store these terms in its memory, or in a remote server, to use in determining content to filter. In other examples, the entered terms may be expanded when the content filter application automatically determines other words associated with the term using dynamic categorized content filtering and searching techniques. In other examples, the filter application may use other techniques known in the art for determining other words associated with the stored word to improve filtering capabilities and accuracy.

The user entered text may be stored as a single term, or with a group of terms that computing device determine to include with the entered term. In other examples, the content filter may store or request storage of the association between the single word and other words or identifiers for use in content filtering. Instead of a list of a single word, or filter criteria, the filter application may display multiple words all associated with a single topic. For example, on FIG. 6A, Syria 210 may be expanded to include "Aleppo, Syrian crisis, bombing, ISIS, terrorism" (not shown in FIG. 6A) and North Korea 220 may also include "nuclear weapons" or other words associated with the specific topic identified in the list or with current or historical events, nicknames, etc. associated with each word listed.

In one example, the operation may include the graphical element associated with the object comprises selecting from a list of applications, specific applications to apply the content filter. In another example, the list of applications is scrollable. In yet another example, operations may include additional indications different from the subset of applications in response to the received indication of the user input.

In some examples, the user may begin entering a term to be added to the filter. The filter application may display suggested terms to use for filtering. The user may indicate adding the term to the group by gesturing at the presence-sensitive display and store the term, or terms, in the filter application (or remote server).

Figure 6B:
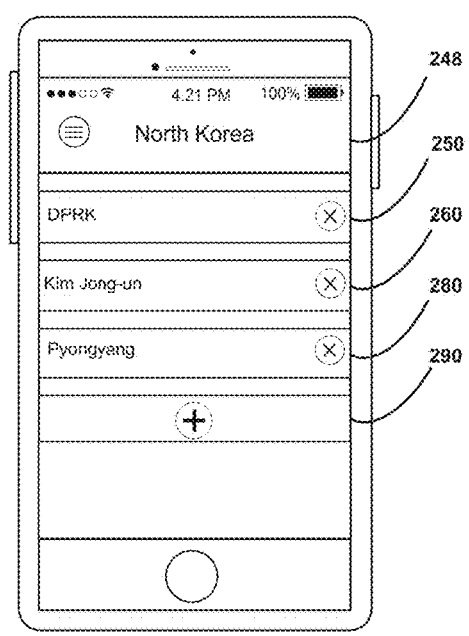

FIG. 6B is a conceptual diagram illustrating an example graphical user interface that includes words that the user may add to a group or topic, for example "North Korea" 248, specific terms that may identify criteria for filtering related content. In the example of FIG. 6B, there may be indications of filter criteria "DPRK" 250, "Kim Jong-un" selected groups of filtered content, in accordance with one or more aspects of the present disclosure. In the example of FIG. 6A, the display may show a list of words identifying a topic or groups associated with criteria for filtering under the heading "Add Group" 208. These words may be predetermined and suggested to the user, or the user may manually input the words (by voice command, typed on a graphical keyboard at the GUI, etc.) or and saved in the filter application The computing device may use these additional terms for broadening the content filter and improving accuracy of filtering content associated with a topic or group or terms.

Figure 7:
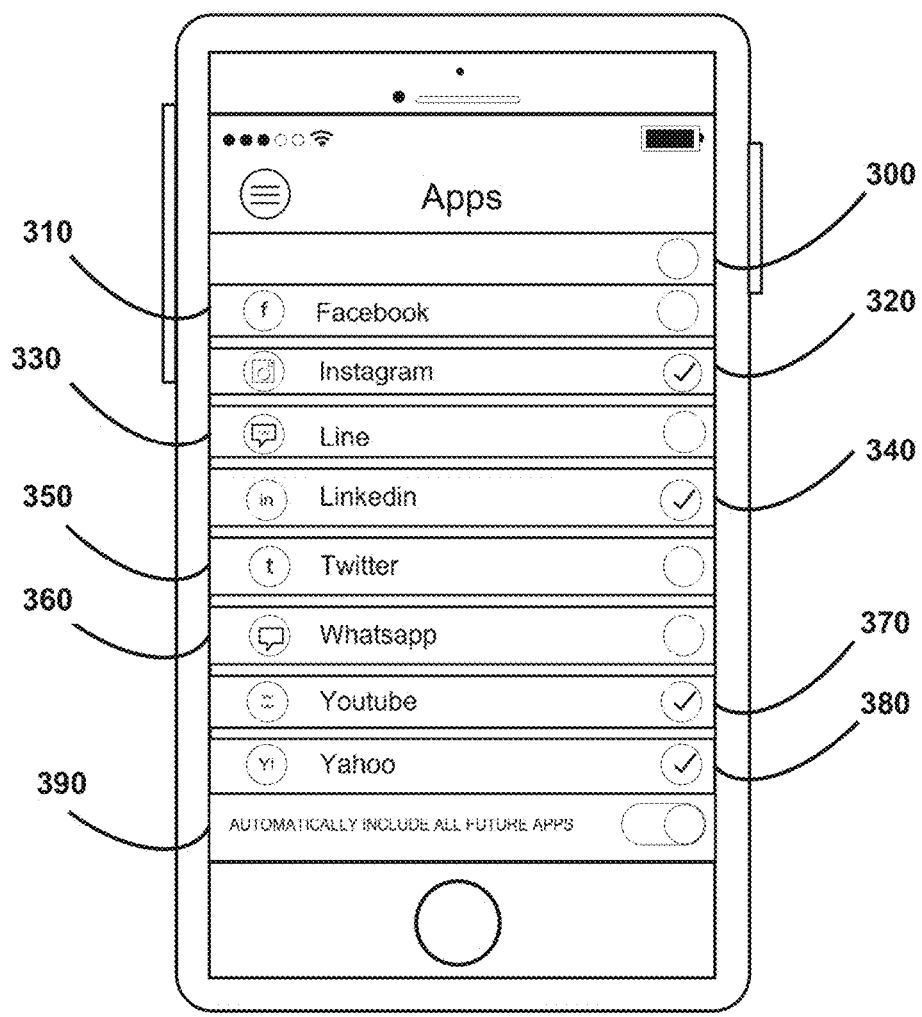
FIG. 7 is a conceptual diagram illustrating an example graphical user interface for selecting applications that apply the content filter, in accordance with one or more aspects of the present disclosure.

FIG. 7 is a conceptual diagram illustrating an example graphical user interface for selecting applications that apply the content filter, in accordance with one or more aspects of the present disclosure. In the example of FIG. 7, computing device 10 may display applications available on the computing device that may utilize the content filter. The list of applications may allow the user to indicate a selection of which applications, from the displayed list of applications, individually, so that the user may select one or more from the list. In the example of FIG. 7, the display shows an identifier that is associated with an application (e.g., graphic, trademark, text, etc.) in a list of eight applications. Based on user input, or an indicated selection of specific applications by including a check next the application identifier. For example, a check mark appears next to application identifiers "Instagram" 320, "Linkedin" 340, "Youtube" 370, and "Yahoo" in the list of eight identified application. Identified applications "Facebook" 310, "Twitter" 350, and "Whatsapp" 360 do not have check marks indicating a selection of an application to apply the content filter. Because of the user indicated selection, or check mark, the application will filter content received by the check or indicated applications only. The applications without a check, or selection, will not have content filtered from the displayed content.

Users may indicate a selection of all applications by checking the "select all" box 300, applying the filter to all applications listed. By indicating a selection of "select all," the application will be applied to all applications available for filtering that are on the computing device. Additionally, the user may select the "automatically include all future apps" box 390, indicating that all future applications installed, updated, downloaded, etc. will automatically apply the filter to content of the application.

In some examples, the computing device may detect an input at the presence sensitive display. In the example of FIG. 2, graphical module 20 may use user gestures to determine a selection of the application to apply the filter. In this example, UI device 4 may detect a touch gesture (e.g., a tap, a swipe, etc. by the user) at a location of UI device 4 that displays filtered content or an indication to show the filtered content. UI device 4 may detect the touch gesture and, in response, a UI module (for example in data 50) may determine whether the touch gesture is at a location associated with one of the graphical buttons indicating to display the filtered content. When the touch gesture is within a specific location or predetermined distance of one of the identified displays, UI module may cause UI device 4 to execute a change in the display of the graphical display, such as add a check mark to indicate selection of an application. In one example, the operation may include the graphical element associated with the object comprises selecting from a list of applications, specific applications to apply the content filter. In another example, the list of applications is scrollable. In yet another example, operations may include may display additional indications different from the subset of applications in response to the received indication of the user input.

Although the invention has been described herein with exemplary embodiments, one skilled in the art will understand that various modifications, changes and variations may be made in the elements, operation and details of the methods of the invention without departing the essential scope thereof. The system described herein may be implemented with some components removed or other components added to the method or system without departing from the invention. The different steps illustrated in the figures may not require the particular order shown in the example figures. Additionally, some steps may be eliminated or some steps may be added or order of some of the steps may be changed to the described flow of steps. Furthermore, one or more steps illustrated in one figure may be appropriately included into another figure in the implementation of the invention without departing the present invention. It is intended that the invention described herein is not limited to the exemplary embodiments or examples given to describe the principles of the invention. An ordinary person skilled in the relevant art may use and implement the present invention in other appropriate examples as well without leaving the scope of the invention. The invention will include all the embodiments within the scope of the appended claims.

In one example, the operations may include that the method for filtering out data content on a computing device that is integrated into the operating system of the computing device. The method may include receiving, by the computing device and in response to a network request by an application, an object associated with content identifiers, and determining, by the computing device and based on an indication of selected filter criteria, a respective weighted probability for the object. The operations may include determining, by the computing device, a graphical element for the application based on the weighted probabilities, and outputting, by the computing device and at the graphical user interface of the computing device, the graphical element.

In another example, the operations further comprise receiving a selection of at least one application from a plurality of applications, and storing, in the computing device, the selection of the at least one application and the selection of filter content. In another example, the operations further comprise generating by the computing device and based on user input associated with the graphical element output and the respective weighted probabilities, an updated plurality of weighted probabilities. Determining the graphical element may be based at least in part on a predetermined threshold for the weighted probabilities. The operations may further include generating, by the computing device, an updated selected filter criteria based on at least one of user input and dynamic filtering. In another example, the operations further include receiving an object containing a plurality of sub-objects, each associating with content identifiers, wherein the graphical element is based on the weighted probability for each sub-object of the object and the content identifiers.

In some operations, the computing device receives permission to access network and account information associated with the respective application. In yet another example, the non-transitory computer readable medium is part of the operating system of the computing device. Some operations may include that the filtering out data content on the computing device is enabled or disabled based on user input at the user interface of the computing device. In another example, the operations include receiving the indication of a selection of filter criteria requires access to an account of the computing device. The operations further include updating the content filter based on an update indication of a user input corresponding to a selection of objects for filtering the output of the graphical element. In some examples, objects comprise at least one of videos, messages, text, documents, images, audio, URLs, and other web data.

In some examples, the operations may include that the output of the graphical element determined based on a first mode wherein the graphical element includes an indication to view filtered content, or a second mode that does not include an indication to view filtered content in the output graphical element. In another example, the indication of a selection of filter criteria is for a group of filter criteria associated with a subject, which is determined by user input. In some examples, the indication of a selection of filter criteria is for a group of filter criteria associated with a data type. The operations of some examples may also include sending an indication, by the computing device to a graphical user interface, notifying the user of filtered content. In some instances, content identifiers may include meta data, cached data, and other data associated with the object.

In another example, a system for filtering content by the operating system of a computing device may including a first database including filter criteria, a second database including a plurality of applications that are associated with a respective network, a processor configured to receive objects associated with content identifiers from the respective network associated with one of the plurality of applications. In some examples the computing device may also have a non-transitory computer readable medium encoded in the operating system of the computing device coupled to said processor to compare the received content identifiers associated with an object with the data stored in the first database, determine a graphical element, based on the comparison of the content identifiers and the data of the first database, for one of applications stored in the second database, and generate a graphical element for one of the plurality of applications based on the comparisons of the objects associated content identifiers and selected filter criteria. In some examples, the operations of the computer program encoded on said non-transitory computer readable medium may include instructions that when executed by said processor cause said processor to generate a graphical element at the user interface of the computing device that excludes the objects associated with filter criteria.

In yet other examples, a computer program product embodied in an operating system of a computing device for filtering content of applications causing a coupled processor to perform operations, including receive an indication of a selection of filter criteria, send an access request to a network associated with the applications, receive an object associated with content identifiers in response to the access request to a network associated with at least one of the applications, determine a respective weighted probability for the received object, and determine a graphical element based on the weighted probabilities and the selection.

Various embodiments have been described. These and other embodiments are within the scope of the following claims.

What is claimed is:

1. A method for filtering out data content on a non-transitory computer-readable storage medium having computer program instructions and data embodied thereon for filtering content displayed on a graphical user interface of a computing device, the computer program instructions and data comprising instructions, which when executed by at least one processor, configure the at least one processor to perform operations of the computing device, the operations comprising:

receiving, by the computing device and in response to at least one of network request by at least one application from a plurality of applications and executing the at least one application of the computing device, an object associated with display content identifiers, wherein the object is at least one of a photo, video, audio file, document, graphics, 2-D image, 3-D image, virtual reality file, URLs, and any combination thereof;

determining, by the computing device and based on an indication of user selected filter criteria and dynamic filtering words, a respective weighted probability for the object;

receiving, from a remote server, additional dynamic filtering words, causing at least one processor to determine an updated weighted probability, based on the weighted probability and the additional dynamic set of filter words;

determining, by the computing device, a graphical element for the at least one application of the plurality of applications based on the weighted probabilities and based on user preferences of an associated user account, wherein the object in a portion of the graphical element that is likely to match filter criteria, based on the updated weighted probability, is replaced in the portion of the graphical element with a different graphical display, including but not limited to another object, a graphical button indicating filtered content, a message indicating filtered content, a graphical image or notification indicating filtered content, and any combination thereof;

outputting, by the computing device and at the graphical user interface of the computing device, the graphical element for each respective application of the plurality of applications selected by user in the associated user account to execute the computer program for filtering content; and storing, in association with the user account information, the additional dynamic filter words and generated updated weighted probability for the object.

2. The method of claim 1, further comprising:
receiving a selection of at least one application from the plurality of applications for filtering content; and
storing, in association with the user account information, the selection of the at least one application and the selection of filter content.

3. The method of claim 1, further comprising generating, by the computing device and based on user input associated with the graphical element output and the respective weighted probabilities, an updated plurality of weighted probabilities.

4. The method of claim 1, wherein the determining the graphical element is based at least in part on a predetermined threshold for the weighted probabilities.

5. The method of claim 1, further comprising receiving an object containing a plurality of sub-objects, each sub-object of the plurality of sub-objects associating with content identifiers, wherein the graphical element is based on the weighted probability for each sub-object of the object and the content identifiers.

6. The method of claim 1, wherein the computer program for filtering content on the computing device receives permission to access network and account information associated with the user for the respective application executing the computer program for filtering content.

7. The method of claim 1, wherein the computer program, which is integrated into at least one of an operating system of the computing device and a downloadable application, is integrated at least in part in the non-transitory computer readable storage medium.

8. The method of claim 1, wherein the filtering out data content on the computing device is enabled or disabled based on user input at the user interface of the computing device, and enabling the filtering out data content further filters content of all network communication, incoming to the computing device and sending from the computing device, that includes the object received or stored in the computing device.

9. The method of claim 1, wherein receiving the indication of a selection of filter criteria requires access to an account of the computing device.

10. The method of claim 1 for filtering out data content, further comprising updating the content filter based on an update indication of a user input corresponding to a selection of objects for filtering the output of the graphical element.

11. The method of claim 1, wherein the output of the graphical element determined based on a first mode wherein the graphical element includes an indication of filtered content allowing access to view the filtered content, or a second mode that does not include an indication of filtered content in the output graphical element.

12. The method of claim 1, wherein the indication of a selection of filter criteria is for a group of filter criteria associated with a subject, which is determined by user input.

13. The method of claim 1, wherein the indication of a selection of filter criteria is for a group of filter criteria associated with a data type.

14. The method of claim 1, wherein filtering out data content further comprises sending an indication, by the computing device to a graphical user interface, notifying the user of filtered content.

15. The method of claim 1, wherein content identifiers comprise meta data, graphical content data, cached data, and other data associated with the object.

16. A system for filtering content by a computing device, comprising:
a first database including filter criteria;
a second database including a plurality of applications that are associated with a respective network;
a processor configured to receive in response to a network request by at least one application from the plurality of applications, an object associated with display content identifiers from the respective network associated with one of the plurality of applications, wherein the object is at least one of a photo, video, audio file, document, graphics, URLs, and any combination thereof; and
a non-transitory computer readable storage medium having computer program instructions and data embodied thereon for filtering content displayed on a graphical user interface of a computing device and encoded in the computing device coupled to said processor, causing said processor to perform operations, the operations comprising:

compare, based on weighted probabilities, the received content identifiers associated with the object with the data stored in the first database;

receive, from a remote server, additional dynamic filtering words, causing at least one processor to determine an updated weighted probability, based on the weighted probability and the updated dynamic set of filter words;

determine a graphical element for one application of the plurality of applications, based on the comparison of the content identifiers and the data of the first database, and based on user preferences of an associated user account, wherein the object in a portion of the graphical element that is likely to match filter criteria, based on the updated weighted probabilities, is replaced in the portion of the graphical element with a different graphical display, including but not limited to another object, a graphical button indicating filtered content, a message indicating filtered content, a graphical image or notification indicating filtered content, and any combination thereof; and generate the graphical element, at the computing device and based on the comparison, for each application of the plurality of applications that is executing the computer program for filtering content; and store, in association with the user account information, the additional dynamic filter words and generated updated weighted probability for the object.

17. The system of claim 16, wherein the computer program encoded on said non-transitory computer readable storage medium includes the computer program instructions that, when executed by said processor, cause said processor to generate the graphical element at the user interface of the computing device and filter the objects associated with filter criteria by generating an updated graphical element that replaces the objects associated with filter criteria with at least one of replacement content and an indication of a filtered object.

18. A computer program product comprising a non-transitory computer-readable storage medium having computer program instructions and data embodied thereon for filtering content displayed on a graphical user interface of a computing device, the computer program instructions and data comprising instructions, which when executed by at least one processor, configure the at least one processor to perform operations, the operations comprising:

receive an indication of a selection of filter criteria;

send an access request to a network associated with at least one application from a plurality of applications;

receive an object associated with content identifiers in response to the access request to a network associated with at least one application from the plurality of applications, wherein the object is at least one of a photo, video, audio file, document, graphics, 2-D image, 3-D image, virtual reality file, URLs, and any combination thereof;

determine a respective weighted probability for the received object;

receive, from a remote server, additional dynamic filtering words, causing at least one processor to determine an updated weighted probability, based on the weighted probability and the updated dynamic set of filter words;

determine a graphical element based on the weighted probabilities and the selection and based on user preferences of an associated user account, wherein the object in a portion of the graphical element that is likely to match filter criteria, based on the updated weighted probability, is replaced in the portion of the graphical element with a different graphical display, including but not limited to another object, a graphical button indicating filtered content, a message indicating filtered content, a graphical image or notification indicating filtered content, and any combination thereof;

output the graphical element, at the computing device and based on the comparison, for each respective application of the plurality of applications selected by user in the associated user account to execute the computer program for filtering content; and store, in association with the user account information, the additional dynamic filter words and generated updated weighted probability for the object.

* * * * *